Dec. 14, 1954

D. G. LITTLE ET AL

OSCILLATOR SYSTEM

Filed April 7, 1950

2,697,171

WITNESSES:

Edward Michaels

Wm. C. Groome

INVENTORS
Donald G. Little &
David R. Tashjian.
BY
F. E. Browder
ATTORNEY

United States Patent Office 2,697,171

Patented Dec. 14, 1954

2,697,171

OSCILLATOR SYSTEM

Donald G. Little and David R. Tashjian, Baltimore, Md., assignors to Westinghouse Electric Corporation, East Pittsburgh, Pa., a corporation of Pennsylvania Application April 7, 1950, Serial No. 154,504

2 Claims. (Cl. 250—36)

This invention relates to oscillator systems, and more particularly to an oscillator system for use in a pulse-type radar system, which oscillator system comprises a diode of the magnetron type.

It is an object of our invention to provide an improved magnetron oscillator system.

In a conventional magnetron oscillator system, a pulse forming network is charged through an isolating or charging impedance from some suitable source of power. The pulse forming network is connected across a magnetron tube through an iron core pulse transformer. A trigger device or electronic switch is provided for periodically causing the pulse forming network to discharge through the primary winding of the pulse transformer. The wave form of the output from the pulse forming network is of such shape as to induce in the secondary of the pulse transformer a main pulse which usually has a flat top. This main pulse is usually of short duration, during which time it causes the magnetron to oscillate vigorously in a steady state. However, after the main pulse is removed, the secondary of the pulse transformer will continue to oscillate feebly until the oscillations damp themselves out. These feeble oscillations sometimes continue almost until the next main pulse is applied. These feeble oscillations are often strong enough to cause the magnetron to oscillate, and consequently are very objectionable in a pulse-type radar system since they cause false targets or echoes to appear on the radar indicating device.

It is an object to provide an improved oscillator system which overcomes the objections mentioned in the foregoing conventional systems.

It is a further object to provide an improved magnetron oscillator system which will not oscillate strong enough, or with enough magnitude after the main pulse is removed to cause false echoes.

It is a still further object to provide an improved magnetron oscillator system in which a bias is applied to dampen spurious oscillations which occur after the main pulse is removed.

These and other objects are effected by our invention as will be apparent from the following description and claims taken in accordance with the accompanying drawing, forming a part of the application in which:

Figure 1:
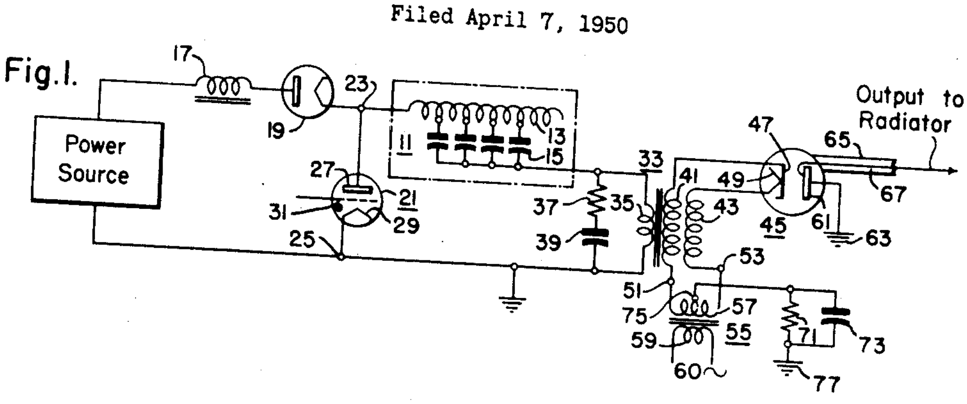
Figure 1 is a schematic diagram of a magnetron oscillator system employing our invention.

Referring to the drawing in detail, in Fig. 1 we show a magnetron oscillator system for use with pulse-type radar apparatus. The oscillator system comprises a pulse forming network 11 made up of inductance 13 and capacitances 15. The pulse forming network 11 is charged from a suitable source of power through a charging impedance 17 and a diode 19. The pulse forming network 11 is discharged by an electronic switch or trigger tube 21 which is connected across points indicated by the reference characters 23 and 25. We show a thyratron tube 21 having a plate 27, a cathode 29 and a grid 31 for triggering the pulse forming network 11 by applying suitable firing potential to the grid 31 of the thyratron. However, it is understood that any suitable triggering or switching mechanism may be used for discharging the pulse forming network 11. The pulse forming network 11 discharges through the primary winding 35 of an iron core pulse transformer 33. A despiking circuit comprising a serially connected resistance 37 and capacitance 39 is connected across the primary winding 35 of the pulse transformer 33. The secondary winding of the pulse transformer comprises two coils 41 and 43. The upper end of the secondary coil 41 is connected to the cathode 47 of a magnetron tube 45, and the upper end of the secondary coil 43 is connected to the filament 49 of the magnetron tube 45. The lower ends of the coils 41 and 43 are connected as by taps 51 and 53 across the ends of the secondary 57 of a filament transformer 55. The primary 59 of the filament transformer is connected to a suitable source of 60-cycle alternating current power. The anode 61 of the magnetron 45 is connected to ground at 63. The output from the magnetron 45 may be connected to an antenna or other radiating device by some conventional means such as indicated by the reference characters 65 and 67.

A parallel-connected resistance 71 and capacitance 73 is connected between the center tap 75 of the secondary 57 of the filament transformer 55 and ground at 77. When the pulse forming network 11 discharges through the primary winding 35 of the pulse transformer 33, it induces in the secondary windings 41 and 43 of the pulse transformer 33 a negative going main pulse which has a flat top and is relatively short in duration of time. This pulse, illustrated by the reference character 79 in Figs. 2 and 4, when applied to the cathode 47 of the magnetron 45 causes the magnetron 45 to oscillate vigorously.

Figure 2:
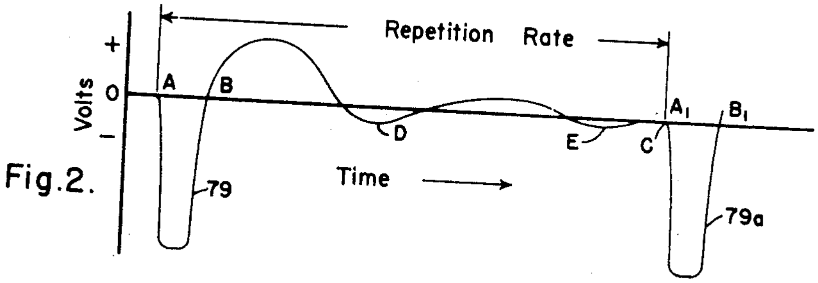
Fig. 2 is a graph illustrating undesirable operating characteristics of a magnetron oscillator system which does not employ our invention.
Figure 3:
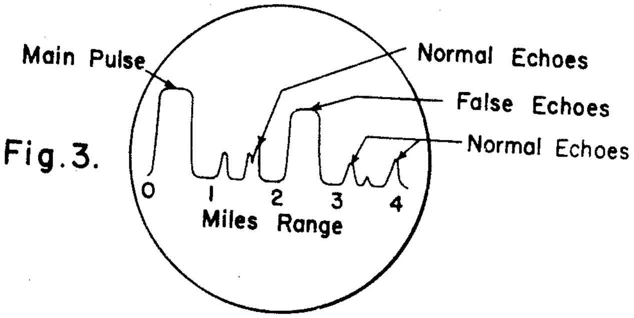
Fig. 3 is the face of a radar indicator illustrating how false echoes or targets will be caused by the undesirable operating characteristics illustrated in Fig. 2; and, Fig. 4 is a graph illustrating desirable operating characteristics of a system employing our invention.

Fig. 2 of the drawing is a graph illustrating the operation of a conventional magnetron oscillator system which possesses undesirable characteristics not attributable to our oscillator system. In such conventional systems, when the main pulse 79 is applied to the cathode 47 of the magnetron 45, the magnetron 45 oscillates vigorously for the time from A to B; however, the secondary of the pulse transformer 33 continues to oscillate feebly from B to C after the main pulse 79 has been removed. These feeble oscillations go far enough negative at points D and E to cause the magnetron 45 to oscillate after the main pulse is removed. These feeble oscillations may last until the next main pulse **79*a* is applied to the magnetron 45**. This characteristic is very objectionable in conventional magnetron oscillators since, when the oscillations go negative as indicated at D and E, these negative oscillations cause false echoes or targets to appear on the radar indicating device as indicated in Fig. 3. These false targets tend to clutter up the face of the indicating instrument, and there is danger of the false targets being mistaken for real targets.

We eliminate the objectionable characteristics described above in our oscillator system by providing the parallel-connected resistance 71 and capacitance 73 connected between the center tap 75 of the secondary 57 of the filament transformer 55 and ground point 77. With our arrangement, magnetron anode current flows from ground point 63 to ground point 77 through the network comprising the resistance 71 and the condenser 73 to the cathode of the magnetron. The network comprising the resistance 71 and the capacitance 73 provides a positive going bias on the cathode 47 which prevents the spurious oscillations from going negative at points D and E to cause the magnetron 45 to oscillate after the main pulse 79 has been removed.

Figure 4:
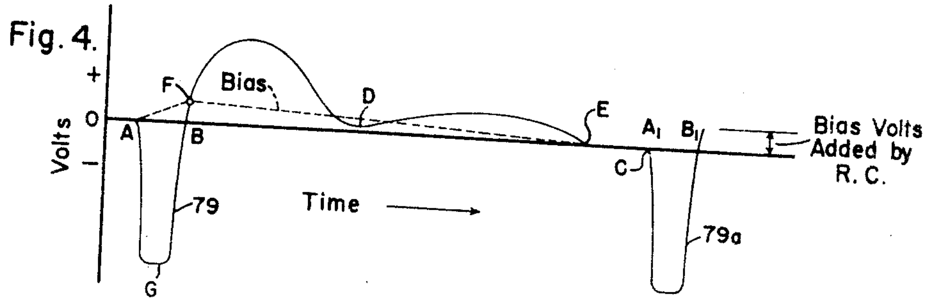

Referring to Fig. 4 which illustrates the characteristics of operation of our magnetron oscillator system, it is seen that the first negative going main pulse 79 is applied to the magnetron 45 from A to B. At the same time that the main pulse 79 is applied to the anode, current starts flowing through the resistance 71 and provides a positive bias on the cathode 47. This bias increases to about point F, at which time it starts decreasing. However, due to the charge on the condenser 73, there is sufficient bias maintained on the cathode 47 to prevent the points D and E of the feeble oscillations, which in the secondary of the pulse transformer 33 after the main pulse 79 has been removed therefrom, from going negative and causing the magnetron 45 to oscillate. As seen from Fig. 4, shortly after the bias reaches zero another negative going main pulse 79a is applied to the magnetron 45, and the magnetron 45 again oscillates vigorously from points $A_1$ to $B_1$. This process is repeated at the repetition rate at which main pulses 79 are applied to the magnetron 45.

It is seen that, in our system since the points D and E (Fig. 4) never go negative, as in the prior art magnetron oscillator systems, false echoes or targets are not produced on the face of the indicating device.

In a practical system, for almost constant direct current bias, the value of the resistance 71 multiplied by the average magnetron direct current should equal the bias voltage desired, and the value of the capacitance 73 should be such that the time constant RC is several times the period of the main pulse repetition rate.

With our system the maximum voltage on the magnetron 45 at point G (Fig. 4) is less than it was in a conventional magnetron oscillator system (Fig. 2) by the amount of the added positive bias. Since the necessary bias to suppress points D and E (Fig. 4) is about 5% of the peak pulse voltage, this reduction in maximum voltage applied to the magnetron 45 is not practically serious.

The bias arrangement provided by our system also minimizes false echoes or targets due to surges or oscillations caused by mismatch of the pulse forming network 11 to the pulse transformer 33 and magnetron 45.

It is seen that our invention has provided an improved magnetron oscillator system in which the magnetron is biased to prevent feeble oscillations which appear in the pulse transformer after the main pulse has been removed therefrom from causing the magnetron to oscillate during the time between the application of main pulses thereto. This prevents false echoes or targets from appearing on the indicating device of a radar system after the main pulse has been removed from the magnetron.

While we have shown our invention in but one form, it will be obvious to those skilled in the art that it is not so limited but is susceptible to various changes and modifications without departing from the spirit and scope thereof, and we desire, therefore, that only such limitations shall be placed thereon as are specifically set forth in the appended claims.

We claim as our invention:

1. In a magnetron oscillator system, a pulse forming network, means for intermittently charging and discharging said pulse forming network, a pulse transformer for forming the output from said pulse network into a short duration main pulse, said pulse transformer comprising a primary winding and a secondary winding, means connecting said primary winding to said pulse forming network, a magnetron comprising at least a cathode and an anode, means connecting said secondary to said cathode, a filament transformer comprising a primary winding and a secondary winding, means connecting said secondary winding of said filament transformer to said secondary winding of said pulse transformer, and a bias network connected between said anode and a center tap on the secondary winding of said filament transformer so that magnetron anode current flow through said network provides a bias which prevents said magnetron from oscillating after said main pulse has been removed.

2. In a magnetron oscillator system, a pulse forming network, means for intermittently charging and discharging said pulse network, a pulse transformer for forming the output from said pulse forming network into a short duration main pulse, said pulse forming transformer comprising a primary winding and a pair of secondary windings, a magnetron comprising a cathode, an anode, and a filament, means connecting one end of one of said pulse transformer secondary windings to said filament and the corresponding end of said other secondary winding of said pulse transformer to said cathode, a filament transformer comprising a primary winding and a secondary winding, means connecting said secondary winding of said filament transformer across the free ends of said secondary winding of said pulse transformer, a bias network comprising a parallel-connected resistor and capacitor, means connecting said bias network between a center tap on the secondary of said filament transformer and said anode so that magnetron anode current flow through said bias network provides a bias which prevents said magnetron from oscillating after said main pulse has been removed from said pulse transformer.

References Cited in the file of this patent

UNITED STATES PATENTS

| Number | Name | Date |
|---|---|---|
| 2,262,044 | Philpott | Nov. 11, 1941 |
| 2,469,977 | Morrison | May 10, 1949 |
| 2,579,542 | Bostwick | Dec. 25, 1951 |